US012763640B2

(12) United States Patent
Hung et al.

(10) Patent No.: US 12,763,640 B2
(45) Date of Patent: Oct. 13, 2026

(54) STATOR STRUCTURE AND FAN USING SAME

(71) Applicant: Delta Electronics, Inc., Taoyuan City (TW)

(72) Inventors: Chen-Yu Hung, Taoyuan City (TW); Hung-Chi Chen, Taoyuan City (TW); Shih-Di Chen, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 155 days.

(21) Appl. No.: 18/945,362

(22) Filed: Nov. 12, 2024

(65) Prior Publication Data

US 2025/0373114 A1 Dec. 4, 2025

(30) Foreign Application Priority Data

Jun. 3, 2024 (CN) ........................ 202421241049.1

(51) Int. Cl.
*H02K 5/24* (2006.01)
*F04D 25/06* (2006.01)
(Continued)

(52) U.S. Cl.
CPC ............... *H02K 5/24* (2013.01); *F04D 25/06* (2013.01); *F04D 25/08* (2013.01); *F04D 29/325* (2013.01);
(Continued)

(58) Field of Classification Search
CPC .......... H02K 5/24; H02K 1/146; H02K 5/225; H02K 7/14; H02K 21/22; H02K 2211/03;
(Continued)

(56) References Cited

U.S. PATENT DOCUMENTS 2,000,386 A * 5/1935 Haynes .................... H02K 5/24 416/246
2,510,130 A * 6/1950 Moore ................... H02K 5/132 277/428
(Continued)

FOREIGN PATENT DOCUMENTS

| | | |
|---|---|---|
| CN | 214900484 U | 11/2021 |
| DE | 202015101733 U1 | 4/2015 |
| EP | 2330720 B1 | 8/2012 |

*Primary Examiner* — Maged M Almawri
(74) *Attorney, Agent, or Firm* — KIRTON McCONKIE; Evan R. Witt

(57) ABSTRACT

A stator structure and a fan using the same are disclosure. The stator structure includes a base, plural stator magnetic poles, a circuit board, a first elastic element and a second elastic element. The base includes a front end and a rear end opposite to each other in an axial direction, and an outer peripheral wall connected therebetween. The plural stator magnetic poles are arranged on the base. The circuit board controls the plural stator magnetic poles. The first elastic element disposed on the outer peripheral wall includes a first head end, a first middle section and a first tail end connected and extended sequentially in a direction surrounding the axial direction. The second elastic element disposed on the outer peripheral wall and has a second head end, a second middle section and a second tail end connected and extended sequentially in a direction parallel to the axial direction.

20 Claims, 7 Drawing Sheets

(51) Int. Cl.

| | |
|---|---|
| ***F04D 25/08*** | (2006.01) |
| ***F04D 29/32*** | (2006.01) |
| ***H02K 1/14*** | (2006.01) |
| ***H02K 9/22*** | (2006.01) |
| ***H02K 11/33*** | (2016.01) |
| ***H02K 21/22*** | (2006.01) |

(52) U.S. Cl.
CPC ............. *H02K 1/146* (2013.01); *H02K 9/227* (2021.01); *H02K 11/33* (2016.01); *H02K 21/22* (2013.01); *H02K 2211/03* (2013.01)

(58) Field of Classification Search
CPC ........ H02K 11/33; H02K 9/227; F04D 25/06; F04D 25/0606; F04D 25/08; F04D 17/162; F04D 29/325; F04D 29/668
USPC ............................................................ 310/51
See application file for complete search history.

(56) References Cited

U.S. PATENT DOCUMENTS

| | | | | | |
|---|---|---|---|---|---|
| 3,491,695 | A * | 1/1970 | Blum | H02K 5/132 | 417/63 |
| RE26,783 | E * | 2/1970 | Boyd | H02K 5/132 | 310/90 |
| 4,377,763 | A * | 3/1983 | Drake | H02K 5/132 | 310/112 |
| 2002/0117908 | A1* | 8/2002 | Sanchez | H02K 5/24 | 310/89 |
| 2013/0088106 | A1* | 4/2013 | Bitzer | H02K 5/10 | 310/71 |
| 2015/0132158 | A1* | 5/2015 | Reeves | F04B 35/04 | 417/410.1 |
| 2017/0225707 | A1* | 8/2017 | Tomizawa | B62D 5/0424 | |
| 2019/0074748 | A1* | 3/2019 | Le Goff | F04D 25/08 | |
| 2020/0343793 | A1* | 10/2020 | Söhnle | H02M 7/003 | |

* cited by examiner

STATOR STRUCTURE AND FAN USING SAME

CROSS-REFERENCE TO RELATED APPLICATION

This application claims priority to China Patent Application No. 202421241049.1, filed on Jun. 3, 2024. The entireties of the above-mentioned patent application are incorporated herein by reference for all purposes.

FIELD OF THE INVENTION

The present disclosure relates to a motor structure and more particularly to a stator structure and a fan using the same, which provides the deformation with multiple degrees of freedom through at least two elastic elements, so as to absorb vibration energy, reduce vibration transmission, and improve the operation efficiency of the fan.

BACKGROUND OF THE INVENTION

Generally speaking, a fan is mainly driven by a motor to rotate a blade set to generate the guided airflow. However, when the motor drives the blade set to rotate, it is easy to generate the vibration.

For solving the problem of the vibration, shock-isolation materials are added into the assembly structure between the base and the housing cover of the conventional motor to achieve better shock isolation effects. However, it needs to be correctly aligned when assembling. The assembly is difficult and time-consuming, and the overall cost is further increased. In addition, there are also shock-isolation solutions of installing the shock-isolation materials around the motor. However, poor contact between the assembly and the shock-isolation materials can easily lead to poor shock isolation effects. Furthermore, the shock-isolation materials need to be assembled separately around the motor, and it is time-consuming.

In other words, it is rare to find a shock absorbing mechanism in the base of the conventional motor. The base carrying the stator often needs to be assembled with the shock-isolation materials such as rubber and silicone, to achieve the effect of reducing vibration transmission. However, the effect is not good. Furthermore, the rubber and silicone need to be completed through additional assembly processes, and it consumes manpower and working hours.

Therefore, there is a need of providing a stator structure and a fan using the same, which provides the deformation with multiple degrees of freedom through at least two elastic elements, so as to absorb the vibration energy, reduce the vibration transmission, improve the operation efficiency of the fan, and address the deficiencies in the prior arts.

SUMMARY OF THE INVENTION

An object of the present disclosure is to provide a stator structure and a fan using the same, which provides the deformation with multiple degrees of freedom through at least two elastic elements, so as to absorb the vibration energy, reduce the vibration transmission, and improve the operation efficiency of the fan.

Another object of the present disclosure is to provide a stator structure and a fan using the same. At the bottom of the base of the stator structure, two elastic elements are spaced apart and disposed at the bottom of the outer peripheral wall. Moreover, the two elastic elements each have the deformation sections with the structural differences, so that the supporting force in the radial direction of the outer peripheral wall and the supporting force in the circumferential direction of the outer peripheral wall relative to the axial direction of the rotating shaft are provided, respectively. It helps to absorb the vibration energy through deformation with multiple degrees of freedom, reduce the vibration transmission and improve the operation efficiency of the fan. In addition, when the base of the stator structure is fixed between the bottom seat and the housing cover of the fan, the positioning structures on the bottom surface of the elastic elements can be aligned with the positioning structures of the base, and the positioning structures on the top surface of the base can be aligned with the positioning structures of the housing cover. In this way, when the base and the housing cover are assembled up and down, the stator structure is firmly fixed therein. On the other hand, the base, for example, adopts a two-piece design of the main body and the rear cover. The main body can be embedded with a heat dissipation metal plate to enhance the heat dissipation performance of the stator component. The circuit board connected to the stator component is sandwiched between the main body and the rear cover, and then led out through the external terminals on the outer peripheral wall. Preferably, the external terminal can further be disposed adjacent to the elastic element that provides the circumferential supporting force. In this way, a stable support is provided in the stator structure when the fan is running, the vibration transmission is eliminated, and the operation efficiency of the fan is improved.

A further object of the present disclosure is to provide a stator structure and a fan using the same. At least two elastic elements provide multi-directional deformation to absorb the vibration energy of the transversely arranged stator structure. The rotating shaft that runs through the stator structure is more suitable for installing the blade sets at the front end and the rear end of the stator structure, to build a single-axis bidirectional fan. When the stator structure is fixed between the bottom seat and the housing cover of the fan and transversely arranged between the front blade set and the rear blade set, the two elastic elements provide the deformation with multiple degrees of freedom relative to the axial direction of the rotating shaft, so as to eliminate the vibration and improve the operation efficiency of the fan.

In accordance with an aspect of the present disclosure, a stator structure is provided. The stator structure includes a base, a plurality of stator magnetic poles, a circuit board, a first elastic element and a second elastic element. The base includes a front end, a rear end, an outer peripheral wall and a through opening, wherein the front end and the rear end are two opposite ends of the base in an axial direction, the through opening runs through a region surrounded by the front end and a region surrounded by the rear end along the axial direction, and the outer peripheral wall is an outer surface connected between the front end and the rear end. The plurality of stator magnetic poles are disposed on the base and centered around the axial direction. The circuit board controls magnetism of the plurality of stator magnetic poles. The first elastic element includes a first head end, a first middle section and a first tail end, wherein the first head end is directly connected to the first middle section and the outer peripheral wall, the first tail end is directly connected to the first middle section and the outer peripheral wall, and the first head end, the first middle section and the first tail end are connected and extended sequentially in a direction around the axial direction. The second elastic element includes a second head end, a second middle section and a second tail end, wherein the second head end is directly connected to the second middle section and the outer peripheral wall, the second tail end is directly connected to the second middle section and the outer peripheral wall, and the second head end, the second middle section and the second tail end are connected and extended sequentially in a direction parallel to the axial direction.

In an embodiment, the first middle section includes a first forward bend a first reverse bend and a second forward bend, and the first forward bend, the first reverse bend and the second forward bend are presented in sequence on the first middle section.

In an embodiment, the first middle section includes a first forward bend, a second forward bend, a first reverse bend, a third forward bend and a fourth forward bend, and the first forward bend, the second forward bend, the first reverse bend, the third forward bend and the fourth forward bend are presented in sequence on the first middle section.

In an embodiment, the second middle section includes a first reverse bend, a first forward bend, a second forward bend and a second reverse bend, and the first reverse bend, the first forward bend, the second forward bend and the second reverse bend are presented in sequence on the second middle section.

In an embodiment, the second middle section includes a first reverse bend, a first forward bend, a second forward bend, a third forward bend, a fourth forward bend and a second reverse bends, and the first reverse bend, the first forward bend, the second forward bend, the third forward bend, the fourth forward bend and the second reverse bend are presented in sequence on the second middle section.

In an embodiment, the stator structure further includes an external terminal, wherein the circuit board is electrically connected to the external terminal.

In an embodiment, the first middle section or the second middle section includes a first positioning structure disposed on an outer surface thereof, and the first positioning structure is used to be assembled with a second positioning structure of a bottom seat.

In an embodiment, the base further includes a third positioning structure disposed on the outer peripheral wall, the third positioning structure is used to be assembled with a fourth positioning structure of a housing cover, and the bottom seat is assembled with the housing cover to cover the outside of the base.

In an embodiment, the base includes a main body and a rear cover, which are assembled together along the axial direction to form the base, wherein the circuit board is disposed between the main body and the rear cover, and the through opening runs through the main body and the rear cover.

In an embodiment, the stator structure further includes a plurality of conductive terminals, wherein the circuit board includes a plurality of conductive contact points, the main body includes a metal plate, and the plurality of conductive terminals passing through the metal plate are in corresponding contact with the conductive contact points, wherein the plurality conductive terminals are not electrically connected to the metal plate.

In an embodiment, the main body includes a plurality of insulation elements disposed on the metal plate, and the plurality of conductive terminals run through the plurality of insulation elements and are electrically connected to the plurality of conductive conduct points.

In an embodiment, the main body includes a metal plate, the metal plate includes a plurality of heat dissipation pillars, and the plurality of heat dissipation pillars face the front end, wherein the main body and the rear cover are engaged and assembled through the first engagement element and the second engagement element.

In accordance with an aspect of the present disclosure, a fan is provided. The fan includes a stator structure, a rotating shaft, a rotor structure and a blade set. The stator structure includes a base, a plurality of stator magnetic poles, a circuit board, a first elastic element and a second elastic element. The base includes a front end, a rear end, an outer peripheral wall and a through opening, wherein the front end and the rear end are two opposite ends of the base in an axial direction, the through opening runs through a region surrounded by the front end and a region surrounded by the rear end along the axial direction, and the outer peripheral wall is an outer surface connected between the front end and the rear end. The plurality of stator magnetic poles are disposed on the base and centered around the axial direction. The circuit board controls magnetism of the plurality of stator magnetic poles. The first elastic element includes a first head end, a first middle section and a first tail end, wherein the first head end is directly connected to the first middle section and the outer peripheral wall, the first tail end is directly connected to the first middle section and the outer peripheral wall, and the first head end, the first middle section and the first tail end are connected and extended sequentially in a direction around the axial direction. The second elastic element includes a second head end, a second middle section and a second tail end, wherein the second head end is directly connected to the second middle section and the outer peripheral wall, the second tail end is directly connected to the second middle section and the outer peripheral wall, and the second head end, the second middle section and the second tail end are connected and extended sequentially in a direction parallel to the axial direction. The rotating shaft is pivotally connected to the stator structure through a bearing, wherein the rotating shaft is disposed along the axial direction, and aligned with the through opening. The rotor structure is connected to the rotating shaft and spatially corresponding to the stator structure, wherein the rotor structure is driven by the stator structure to rotate around the axial direction. The blade set is connected to the rotating shaft, wherein the blade set is driven by the rotor structure and the rotating shaft to rotate and generate an airflow.

In an embodiment, the first middle section includes a first forward bend, a first reverse bend and a second forward bend, and the first forward bend, the first reverse bend and the second forward bend are presented in sequence on the first middle section.

In an embodiment, the first middle section includes a first forward bend, a second forward bend, a first reverse bend, a third forward bend and a fourth forward bend, and the first forward bend, the second forward bend, the first reverse bend, the third forward bend and the fourth forward bend are presented in sequence on the first middle section.

In an embodiment, the second middle section includes a first reverse bend, a first forward bend, a second forward bend and a second reverse bend, and the first reverse bend, the first forward bend, the second forward bend and the second reverse bend are presented in sequence on the second middle section.

In an embodiment, the second middle section includes a first reverse bend, a first forward bend, a second forward bend, a third forward bend, a fourth forward bend and a second reverse bend, and the first reverse bend, the first forward bend, the second forward bend, the third forward bend, the fourth forward bend and the second reverse bend are presented in sequence on the second middle section.

In an embodiment, the stator structure further includes an external terminal, and the circuit board is electrically connected to the external terminal.

In an embodiment, the fan further includes a bottom seat and a housing cover, the stator structure is fixed between the bottom seat and the housing cover, and the bottom seat and the housing cover are matched and assembled with each other to form an air inlet, an air outlet and an accommodation space, wherein the air inlet is arranged adjacent to the stator structure, the air inlet is in communication with the air outlet through the accommodation space along the axial direction, the blade set is accommodated in the accommodation space, and the rotating shaft runs through the air inlet and connected to the blade set.

In an embodiment, the air inlet includes a front air inlet and a rear air inlet, the air outlet includes a front air outlet and a rear air outlet, and the accommodation space includes a front accommodation space and a rear accommodation space, wherein the front air inlet is disposed adjacent to the front end of the base, and the front air inlet is in communication with the front air outlet through the front accommodation space along the axial direction, wherein the rear air inlet is disposed adjacent to the rear end of the base, and the rear air inlet is in communication with the rear air outlet through the rear accommodation space along the axial direction, wherein the blade set includes a front blade set and a rear blade set, the front blade set and the rear blade set are accommodated in the front accommodation space and the rear accommodation space, respectively, the rotating shaft runs through the stator structure through the through opening, the rotating shaft runs through the front air inlet and is connected to the front blade set, and the rotating shaft runs through the rear air inlet and is connected to the rear blade set.

In an embodiment, the first middle section or the second middle section includes a first positioning structure disposed on an outer surface thereof, and the first positioning structure is used to be assembled with a second positioning structure of the bottom seat.

In an embodiment, the base further includes a third positioning structure disposed on the outer peripheral wall, the third positioning structure is used to be assembled with a fourth positioning structure of the housing cover, and the bottom seat is assembled with the housing cover to cover the outside of the base.

In an embodiment, the bottom seat and the housing cover are assembled by engaging a first engagement element and a second engagement respectively disposed thereon.

In an embodiment, the bottom seat and the housing cover are assembled through a fastening element.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
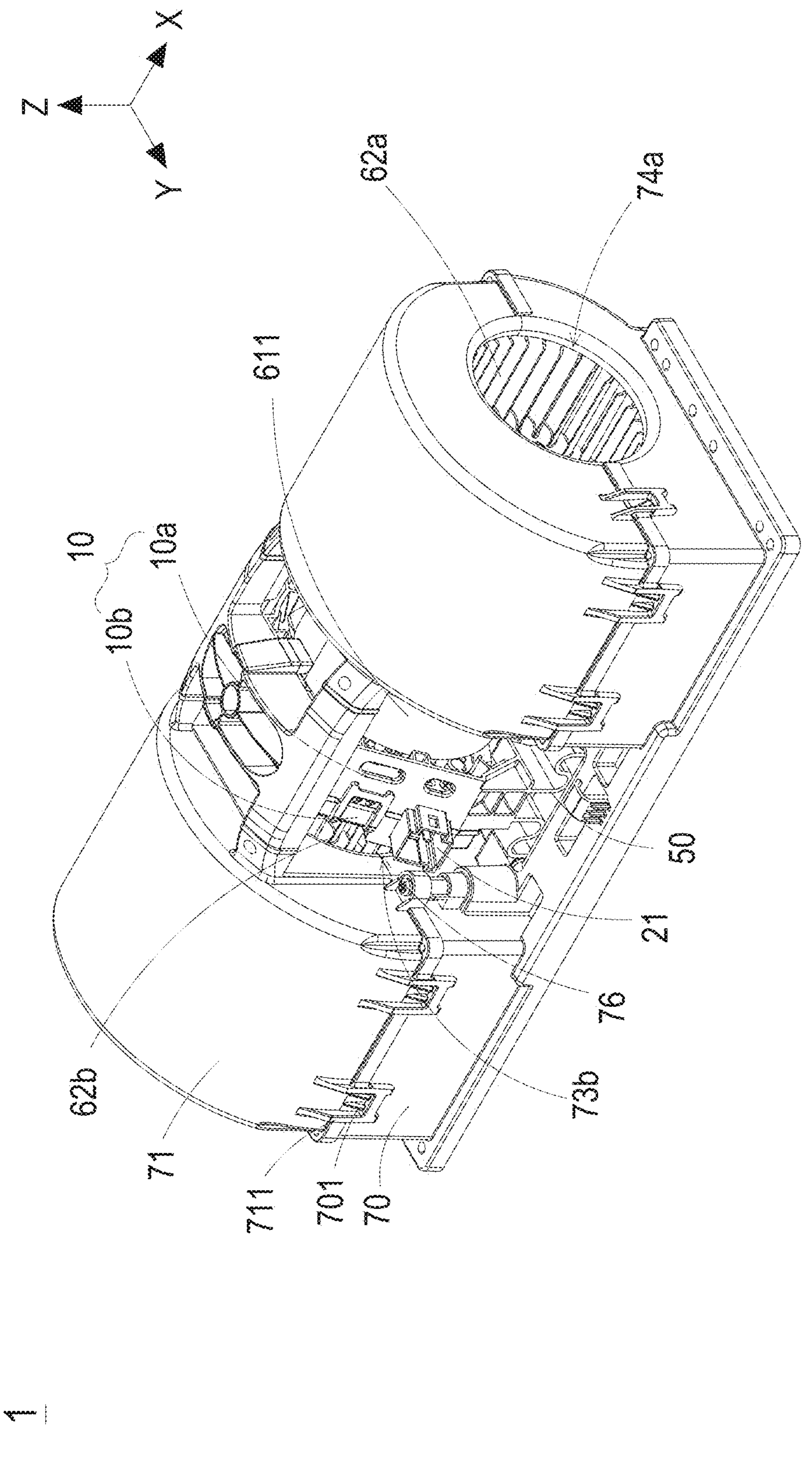
FIG. 1 is a structural perspective view illustrating a fan according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "inner," "outer," "front," "rear," "head," "tail," "top," "bottom," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second, and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items.

Figure 2:
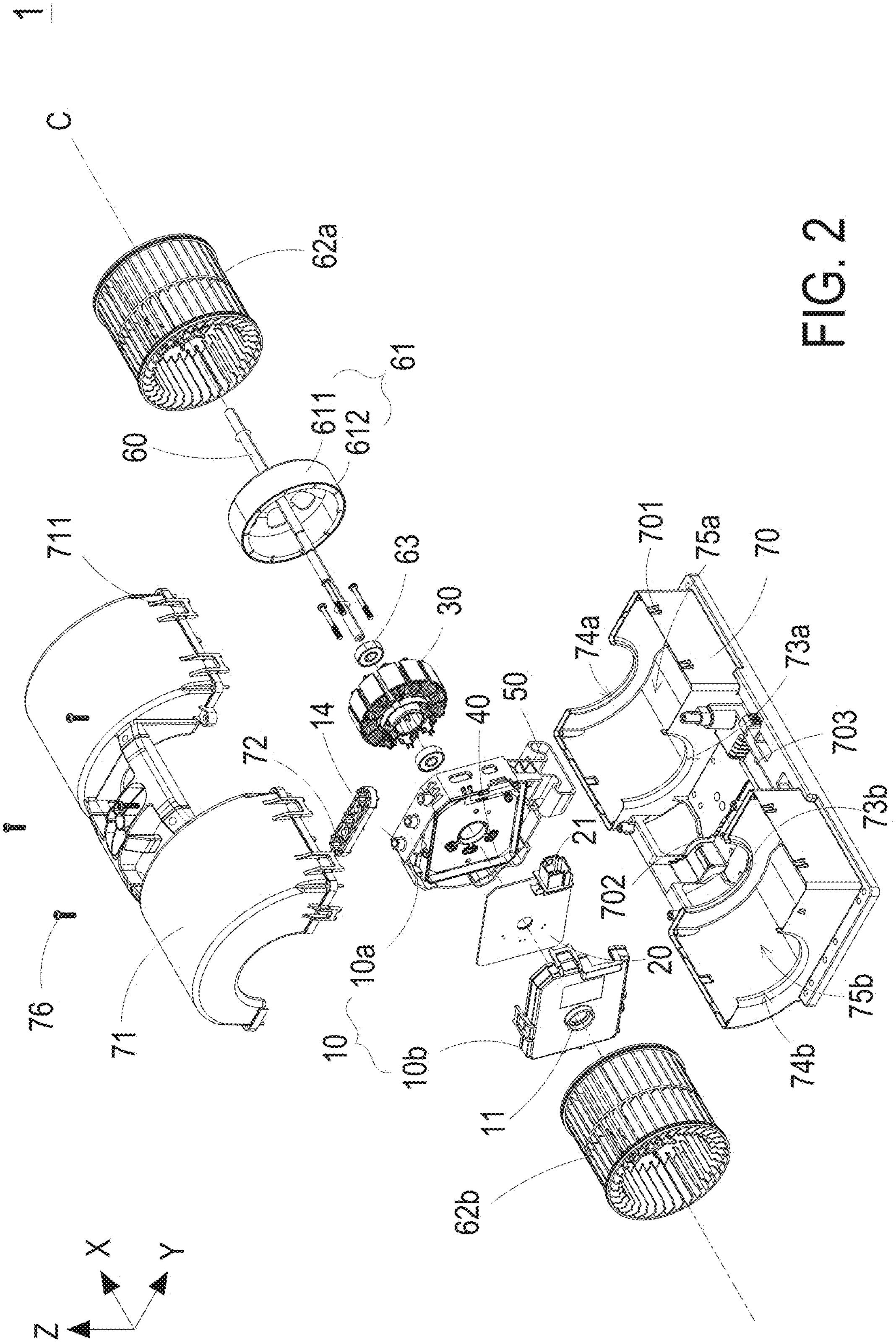
FIG. 2 is a schematic exploded view illustrating the fan according to the embodiment of the present disclosure.
Figure 3:
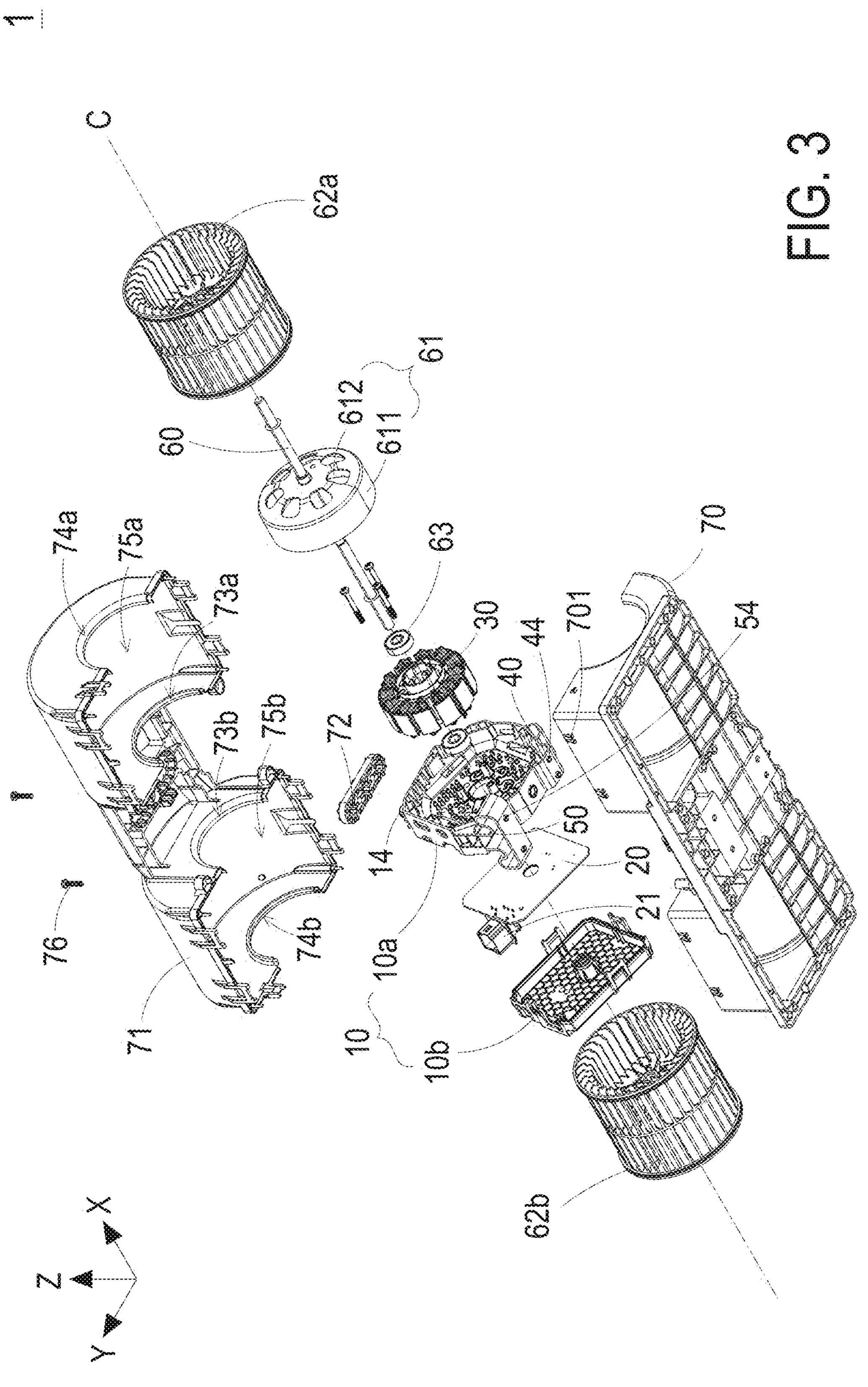
FIG. 3 is a schematic exploded view illustrating the fan according to the embodiment of the present disclosure and taken from another perspective.
Figure 4:
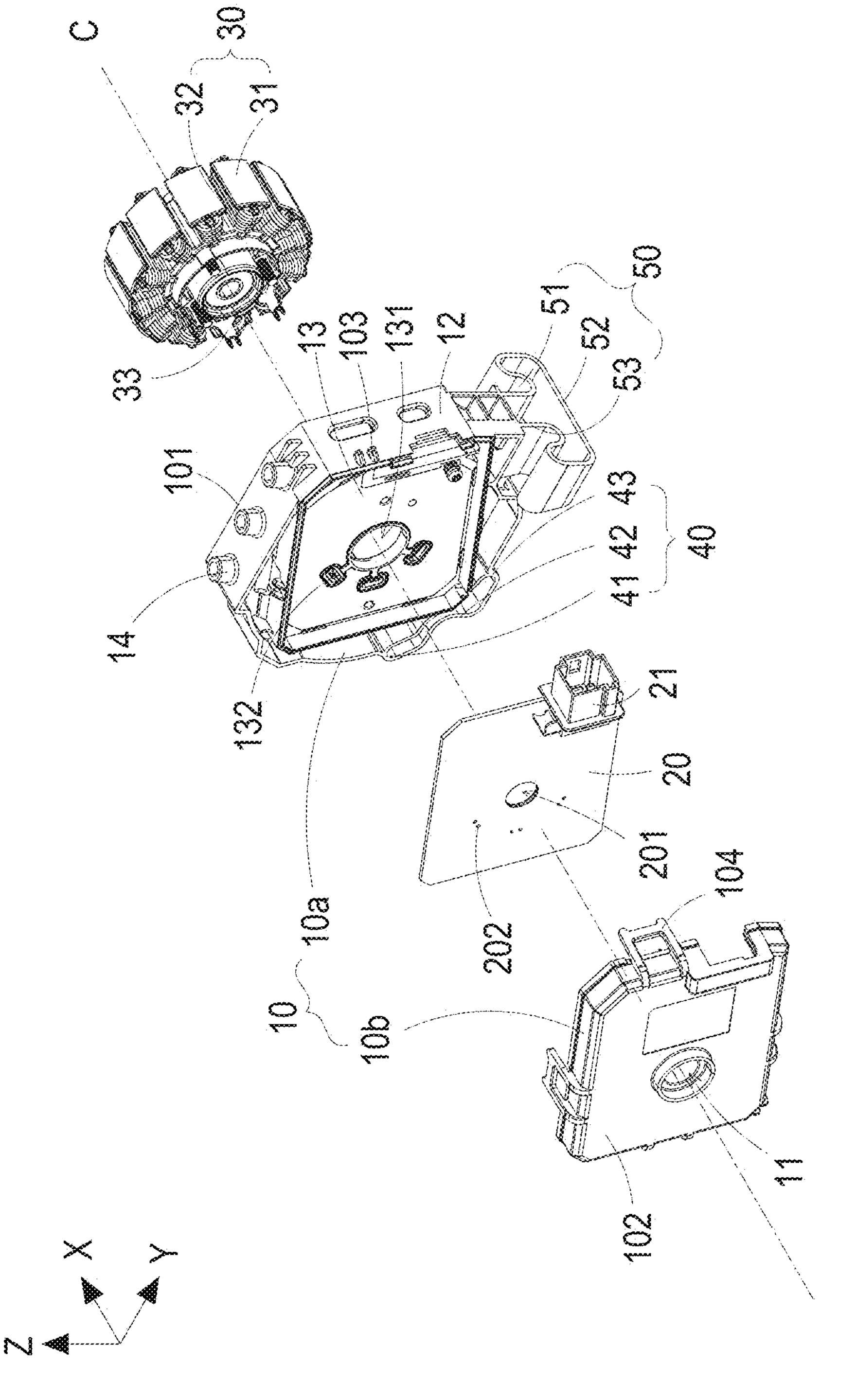
FIG. 4 is a schematic exploded view illustrating the stator structure according to the embodiment of the present disclosure.
Figure 5:
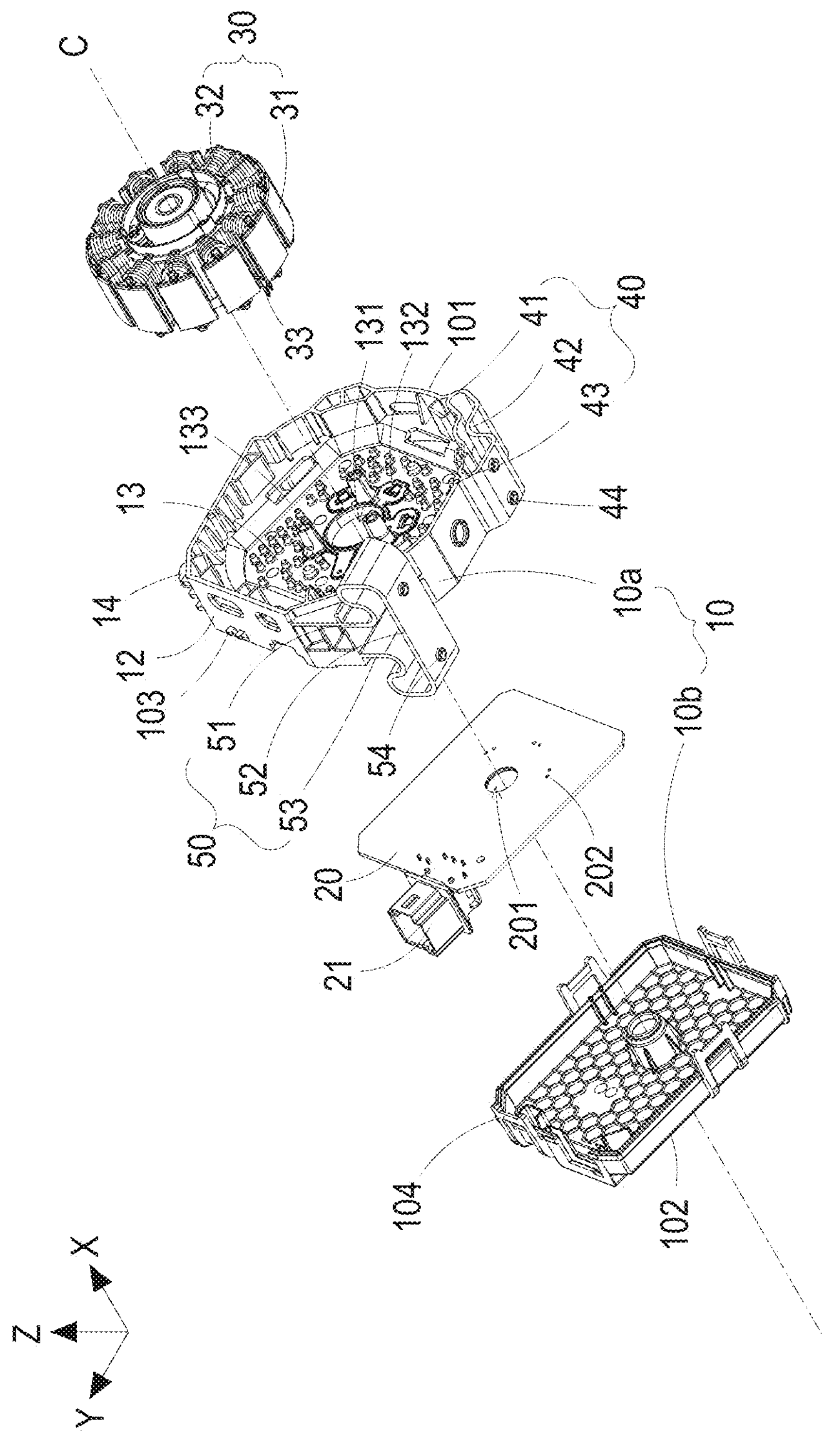
FIG. 5 is a schematic exploded view illustrating the stator structure according to the embodiment of the present disclosure and taken from another perspective.
Figure 6:
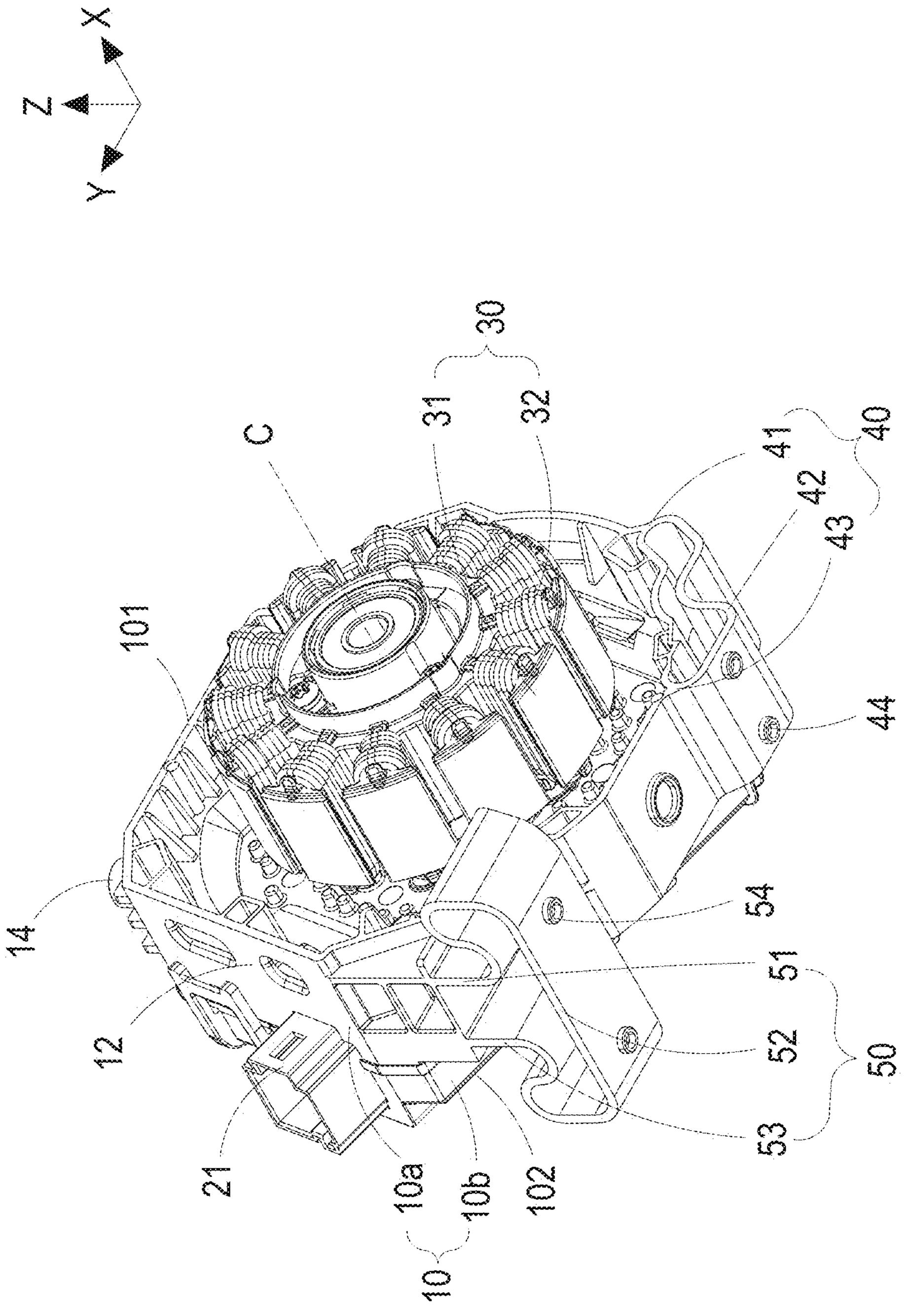
FIG. 6 is a structural perspective view illustrating the stator structure according to the embodiment of the present disclosure.
Figure 7:
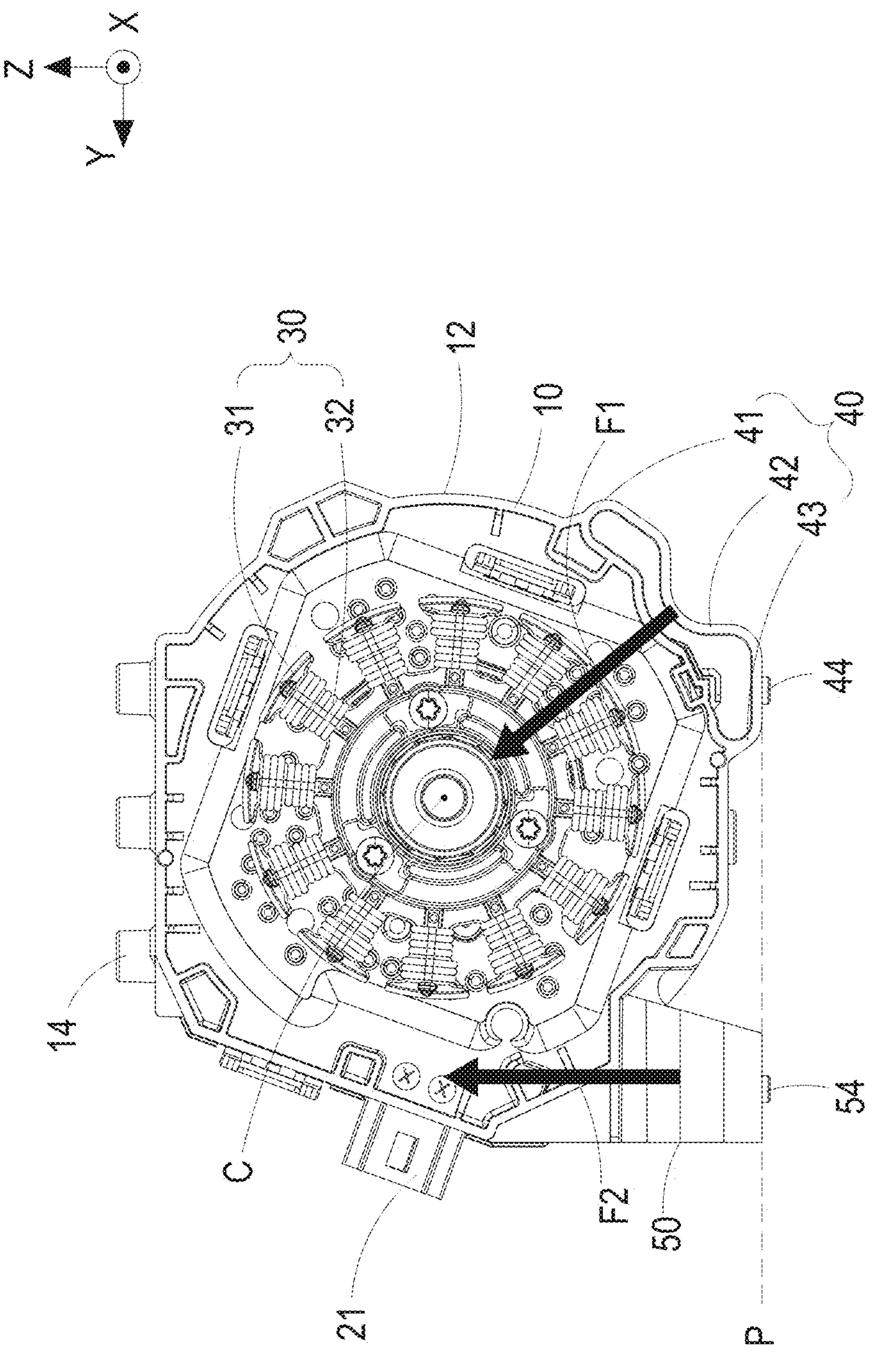
FIG. 7 is a schematic diagram showing the corresponding relationship between the elastic elements and the supporting forces in the stator structure according to the embodiment of the present disclosure.

Please refer to FIG. 1 to FIG. 7. The present disclosure provides a stator structure 2 and a fan 1 using the same, which provides the deformation with multiple degrees of freedom for absorbing the vibration energy and reducing the vibration transmission, so as to improve the operation efficiency of the fan 1. In the embodiment, the fan 1 includes a stator structure 2, a rotating shaft 60, a rotor structure 61 and blade sets 62*a*, 62*b*. The stator structure 2 includes a base 10, a plurality of stator magnetic poles 31, a circuit board 20, a first elastic element 40 and a second elastic element 50. The base 10 includes a front end 101, a rear end 102, an outer peripheral wall 12 and a through opening 11. The front end 101 and the rear end 102 are two opposite ends of the base 10 in an axial direction C. The through opening 11 runs through a region surrounded by the front end 101 and a region surrounded by the rear end 102 along the axial direction C. Moreover, the outer peripheral wall 12 is an outer surface connected between the front end 101 and the rear end 102. The plurality of stator magnetic poles 31 are disposed on the front end 101 of the base 10 and centered around the axial direction C. A winding 32 is wound around each stator pole 31 correspondingly to form the stator component 30. The circuit board 20 is disposed on the base 10, electrically connected to the stator component 30, and configured to control magnetism of the plurality of stator magnetic poles 31. The first elastic element 40 and the second elastic element 50 are disposed adjacent to the bottom of the outer peripheral wall 12, respectively, are spaced apart from each other. Preferably but not exclusively, the first elastic element 40 and the second elastic element 50 are respectively located on the left side and the right side of the bottom of the outer peripheral wall 12, respectively. In the embodiment, two ends of the first elastic element 40 are connected to the outer peripheral wall 12 of the base 10, respectively, and configured to provide a first supporting force F1 to support the base 10 along the radial direction of the outer peripheral wall 12. Two ends of the second elastic element 50 are also connected to the outer peripheral wall 12 of the base 10, respectively, and configured to provide a second supporting force F2 to support the base 10 along the circumferential direction of the outer peripheral wall 12. In other words, the first elastic element 40 and the second elastic element 50 are spaced apart from each other and disposed on the bottom of the outer peripheral wall 12. Since the first elastic element 40 and the second elastic element 50 each have the deformation sections with the structural differences, the supporting force in the radial direction of the outer peripheral wall 12 and the supporting force in the circumferential direction of the outer peripheral wall 12 relative to the axial direction C of the rotating shaft 60 are provided, respectively. It allows to absorb the vibration energy through deformation with multiple degrees of freedom, and reduce the vibration transmission. The structural differences between the first elastic element 40 and the second elastic element 50 will be described later. In the embodiment, the rotating shaft 60 is pivotally connected to the stator component 30 of the stator structure 2 through a bearing 60. Furthermore, the rotating shaft 60 is disposed along the axial direction C, and aligned with the through opening 11. Preferably but not exclusively, the rotor structure 61 includes an outer shield 611 and a magnet 612. The magnet 612 is arranged around the inner wall of the outer shield 611. The rotor structure 61 is connected to the rotating shaft 60 through the outer shield 611. The rotor structure 2 is spatially corresponding to the stator component 30 of the stator structure 2, and the plurality of stator magnetic poles 31 and the winding 32 of the stator component 30 are surrounded by the magnet 612. In this way, the rotor structure 61 can be driven by the stator component 30 of the stator structure 2 to rotate around the axial direction C. In the embodiment, the blade sets 62*a*, 62*b* are connected to the rotating shaft 60. Furthermore, the blade sets 62*a*,62*b* are driven by the rotor structure 61 and the rotating shaft 60 to rotate and generate an airflow.

In the embodiment, the supporting forces of the stator structure 2 in multi directions are mainly formed by the structural differences between the first elastic element 40 and the second elastic element 50. Preferably but not exclusively, the first elastic element 40 includes a first head end 41, a first middle section 42 and a first tail end 43. The first head end 41 is directly connected to the first middle section 42 and the outer peripheral wall 12, the first tail end 43 is directly connected to the first middle section 42 and the outer peripheral wall 12, and the first head end 41, the first middle section 42 and the first tail end 43 are connected and extended sequentially in a direction around the axial direction C. Furthermore, in the embodiment, the second elastic element 50 includes a second head end 51, a second middle section 52 and a second tail end 53. Preferably but not exclusively, the second head end 51 is directly connected to the second middle section 52 and the outer peripheral wall 12, the second tail end 53 is directly connected to the second middle section 52 and the outer peripheral wall 12, and the second head end 51, the second middle section 52 and the second tail end 53 are connected and extended sequentially in a direction parallel to the axial direction C. Preferably but not exclusively, in the embodiment, the first middle section 42 includes a first forward bend, a first reverse bend and a second forward bend, and the first forward bend, the first reverse bend and the second forward bend are presented in sequence on the first middle section. In another embodiment, the first middle section 42 includes a first forward bend, a second forward bend, a first reverse bend, a third forward bend and a fourth forward bend, and the first forward bend, the second forward bend, the first reverse bend, the third forward bend and the fourth forward bend are presented in sequence on the first middle section. Preferably but not exclusively, in the embodiment, the second middle section 52 includes a first reverse bend, a first forward bend, a second forward bend a second reverse bend, and the first reverse bend, the first forward bend, the second forward bend and the second reverse bend are presented in sequence on the second middle section. In another embodiment, the second middle section 52 includes a first reverse bend, a first forward bend, a second forward bend, a third forward bend, a fourth forward bend and a second reverse bend, and the first reverse bend, the first forward bend, the second forward bend, the third forward bend, the fourth forward bend and the second reverse bend are presented in sequence on the second middle section. In addition, preferably but not exclusively, the first middle section 42 and the second middle section 52 each include parts parallel to the bottom surface (or XY plane) of the outer peripheral wall 12, so that a coplanar plane P is formed thereon to facilitate assembling or fixing. Certainly, the present disclosure is not limited thereto. In the embodiment, the first elastic element 40 and the second elastic element 50 respectively provide the radial supporting force (i.e., the first supporting force F1) and the circumferential supporting force (i.e., the second supporting force F2) along the outer peripheral wall 12 relative to the axial direction C of the rotating shaft 60 through the deformation sections with the structural differences, so that the deformation with multiple degrees of freedom can absorb the vibration energy, reduce the vibration transmission, and improve the operation efficiency of the fan 1. Certainly, in other embodiments, the length, the width and the bends combination of the first elastic element 40 and the second elastic element 50 are adjustable according to the practical requirements. The present disclosure is not limited thereto.

In the embodiment, the fan 1 further includes a bottom seat 70 and a housing cover 71. The stator structure 2 is fixed between the bottom seat 70 and the housing cover 71. Moreover, the bottom seat 70 and the housing cover 71 are matched and assembled with each other to form air inlets 73*a*, 73*b*, air outlets 74*a*, 74*b* and accommodation spaces 75*a*, 75*b*. Preferably but not exclusively, the air inlets 73*a*, 73*b* are arranged adjacent to the stator structure 2, respectively. The air inlets 73*a*, 73*b* are respectively in communication with the air outlets 74*a*, 74*b* through the accommodation spaces 75*a*, 75*b* along the axial direction C. The blade sets 62*a*, 62*b* are accommodated in the accommodation spaces 75*a*, 75*b*, respectively, and the rotating shaft 60 runs through the air inlets 73*a*, 73*b* and connected to the blade sets 62*a*, 62*b*.

Notably, in the embodiment, the fan 1 can be for example but not limited to a single-axis bidirectional fan. Preferably but not exclusively, the fan 1 includes a front air inlet 73*a*, a rear air inlet 73*b*, a front air outlet 74*a*, a rear air outlet 74*b*, a front accommodation space 75*a*, a rear accommodation space 75*b*, a front blade set 62*a* and a rear blade set 62*b*. The air inlet 73*a* is arranged adjacent to the front end 101 of the base 10, the air inlet 73*a* is in communication with the air outlet 74*a* through the accommodation space 75*a* along the axial direction C. The air inlet 73*b* is arranged adjacent to the rear end 102 of the base 10, the air inlet 73*b* is in communication with the air outlet 74*b* through the accommodation space 75*b* along the axial direction C. The front blade set 62*a* and the rear blade set 62*b* are accommodated in the front accommodation space 75*a* and the rear accommodation space 75*b*, respectively. In the embodiment, the rotating shaft 60 passes through the stator component 30 and the base 10 through the through opening 11. Moreover, the rotating shaft 60 runs through the front air inlet 73*a* and connected to the front blade set 62*a*, and the rotating shaft 60 also runs through the rear air inlet 73*b* and connected to the rear blade set 62*b*. Since the base 10 can provide multi-directional deformation with degrees of freedom through the first elastic element 40 and the second elastic element 50 to absorb the vibration energy of the transversely arranged stator structure 2, the rotating shaft 60 transversely running through the stator structure 2 is more suitable for installing the front blade set 62*a* and the rear blade set 62*b* at the front and rear ends of the stator structure 2, to build a single-axis bidirectional fan. When the stator structure 2 is fixed between the bottom seat 70 and the housing cover 71 of the fan 1 and transversely arranged between the front blade set 62*a* and the rear blade set 62*b*, the first elastic element 40 and the second elastic element 50 further provide the deformation with multiple degrees of freedom relative to the axial direction C of the rotating shaft 60, so as to eliminate the vibration and improve the operation efficiency of the fan 1. In other embodiments, the front fan structure or the rear fan structure may be omitted. For example, the rear fan structure may be omitted, and the rotating shaft 60 may not penetrate the through opening 11 or the base 10. Certainly, the present disclosure is not limited thereto.

In the embodiment, the first middle section 42 of the first elastic element 40 includes a first positioning structure 44 disposed on an outer surface thereof and protruding downwardly. Moreover, the first positioning structure 44 is used to be assembled and matched with a second positioning structure 702 of the bottom seat 70. In the embodiment, the second middle section 52 of the second elastic element 50 includes a first positioning structure 54 disposed on an outer surface thereof and protruding downwardly. Moreover, the first positioning structure 54 is used to be assembled and matched with a second positioning structure 703 of the bottom seat 70. Preferably but not exclusively, in the embodiment, the outer surface of the first middle section 42 with the first positioning structure 44 disposed thereon and the outer surface of the second middle section 52 with the first positioning structure 54 disposed thereon further collaboratively form the coplanar plane P. When the stator structure 2 is fixed to the bottom seat 70 through the base 10, a positioning function is further provided by the first positioning structure 44 of the first elastic element 40 and the first positioning structure 54 of the second elastic element 50, and the stability of the stator structure 2 on the bottom seat 70 is increased at the same time. On the other hand, the base 10 further includes a third positioning structure 14 disposed on the top surface of the outer peripheral wall 12, and protruding upwardly. The third positioning structure 14 is used to be assembled with a fourth positioning structure 72 of the housing cover 71. Preferably but not exclusively, the fourth positioning structure 72 is detachably connected to the housing cover 71. In the embodiment, the bottom seat 70 includes a first engagement element 701, and the housing cover 71 includes a second engagement element 711. Preferably but not exclusively, the bottom seat 70 and the housing cover 71 are assembled by engaging the first engagement element 701 and the second engagement element 711, so that the bottom seat 70 is assembled with the housing cover 71 to cover the outside of the base 10. Moreover, the stator structure 2, the rotating shaft 60, the rotor structure 61 and the blade sets 62*a*, 62*b* are arranged between the bottom seat 70 and the housing cover 71. Notably, when the housing cover 71 and the bottom seat 70 are assembled through the first engagement element 701 and the second engagement element 711, the third positioning structure 14, the first positioning structure 44 and the first positioning structure 54 arranged on the upper portion and the lower portion of the stator structure 2, respectively, have advantages of providing the positioning function and increasing the stability of the stator structure 2. Preferably but not exclusively, in the embodiment, the bottom seat 70 and the housing cover 71 are assembled and fastened through a fastening element 76 such as the screw. Certainly, the present disclosure is not limited thereto.

Preferably but not exclusively, in the embodiment, the base 10 is a two-piece structure, including a main body 10*a* and a rear cover 10*b*. The main body 10*a* and the rear cove 10*b* are assembled together along the axial direction C to form the base 10. The circuit board 20 is disposed between the main body 10*a* and the rear cover 10*b*. Moreover, the through opening 11 runs through the main body 10*a* and the rear cover 10*b*. In the embodiment, the main body 10*a* includes a first engagement element 103, and the rear cover 10*b* includes a second engagement element 104. The main body 10*a* and the rear cover 10*b* are engaged and assembled through the first engagement element 103 and the second engagement 104, respectively. In addition, in the embodiment, the first elastic element 40 and the second elastic element 50 are described as being disposed on the main body 10*a*, but the present disclosure is not limited thereto.

In the embodiment, the main body 10*a* includes a metal plate 13. Preferably but not exclusively, the through opening 11 runs through the through opening 131 of the metal plate 13. Moreover, the metal plate 13 includes a plurality of heat dissipation pillars 133, and the plurality of heat dissipation pillars 133 face the front end 101 and the stator component 30. The plurality of heat dissipation pillars 133 are configured to dissipate the heat generated by the stator component 30. In addition, in the embodiment, the through opening 131 of the metal plate 13 and the through opening 201 of the circuit board 20 are both in communication with the through opening 11, so as to allow the rotating shaft 60 to pass through. Certainly, the present disclosure is not limited thereto.

In the embodiment, the stator component 30 further includes a plurality of conductive terminals 33. The circuit board 20 includes a plurality of conductive contact points 202. The plurality of conductive terminals 33 and the plurality of conductive contact points 202 are spatially corresponding to each other. In the embodiment, the main body 10*a* includes a plurality of insulation elements 132 running through the metal plate 13. The plurality of conductive terminals 33 of the stator component 30 run through the plurality of insulation elements 132, respectively, and are electrically connected to the plurality of conductive conduct points 202 of the circuit board 20. Thereby, the plurality of conductive terminals 33 passing through the metal plate 13 are in corresponding contact with the conductive contact points 202, and the plurality conductive terminals 33 are not electrically connected to the metal plate 13.

In the embodiment, the stator structure 2 further includes an external terminal 21 arranged on the outer peripheral wall 12 of the base 10. The external terminal 21 is disposed adjacent to the second elastic element 50, and the external terminal 21 is not covered by the bottom seat 70 and the housing cover 71. The circuit board 20 is electrically connected to the external terminal 21. Preferably but not exclusively, the circuit board 20 connected to the stator component 30 is sandwiched between the main body 10*a* and the rear cover 10*b*, and the circuit board 20 can be led out through the external terminals 21 disposed on the outer peripheral wall 12. The external terminal 21 may further be disposed adjacent to the second elastic element 50 that provides the circumferential supporting force (i.e., the second supporting force F2). In this way, a stable support is provided in the stator structure 2 when the fan 1 is running, the vibration transmission is eliminated, and the operation efficiency of the fan 1 is improved. Certainly, the present disclosure is not limited thereto and not redundantly described hereafter.

In summary, the present disclosure provides a stator structure and a fan using the same, which provides the deformation with multiple degrees of freedom through at least two elastic elements, so as to absorb the vibration energy, reduce the vibration transmission, and improve the operation efficiency of the fan. At the bottom of the base of the stator structure, two elastic elements are spaced apart and disposed at the bottom of the outer peripheral wall. Moreover, the two elastic elements each have the deformation sections with the structural differences, so that the supporting force in the radial direction of the outer peripheral wall and the supporting force in the circumferential direction of the outer peripheral wall relative to the axial direction of the rotating shaft are provided, respectively. It helps to absorb the vibration energy through deformation with multiple degrees of freedom, reduce the vibration transmission and improve the operation efficiency of the fan. In addition, when the base of the stator structure is fixed between the bottom seat and the housing cover of the fan, the positioning structures on the bottom surface of the elastic elements can be aligned with the positioning structures of the base, and the positioning structures on the top surface of the base can be aligned with the positioning structures of the housing cover. In this way, when the base and the housing cover are assembled up and down, the stator structure is firmly fixed therein. On the other hand, the base, for example, adopts a two-piece design of the main body and the rear cover. The main body can be embedded with a heat dissipation metal plate to enhance the heat dissipation performance of the stator component. The circuit board connected to the stator component is sandwiched between the main body and the rear cover, and then led out through the external terminals on the outer peripheral wall. Preferably, the external terminal can further be disposed adjacent to the elastic element that provides the circumferential supporting force. In this way, a stable support is provided in the stator structure when the fan is running, the vibration transmission is eliminated, and the operation efficiency of the fan is improved. In addition, at least two elastic elements provide multi-directional deformation to absorb the vibration energy of the transversely arranged stator structure. The rotating shaft that runs through the stator structure is more suitable for installing the blade sets at the front end and the rear end of the stator structure, to build a single-axis bidirectional fan. When the stator structure is fixed between the bottom seat and the housing cover of the fan and transversely arranged between the front blade set and the rear blade set, the two elastic elements provide the deformation with multiple degrees of freedom relative to the axial direction of the rotating shaft, so as to eliminate the vibration and improve the operation efficiency of the fan.

While the disclosure has been described in terms of what is presently considered to be the most practical and preferred embodiments, it is intended to cover various modifications and similar arrangements included within the spirit and scope of the appended claims which are to be accorded with the broadest interpretation so as to encompass all such modifications and similar structures.

What is claimed is:

1. A stator structure, comprising:

a base comprising a front end, a rear end, an outer peripheral wall and a through opening, wherein the front end and the rear end are two opposite ends of the base in an axial direction, the through opening runs through a region surrounded by the front end and a region surrounded by the rear end along the axial direction, and the outer peripheral wall is an outer surface connected between the front end and the rear end;

a plurality of stator magnetic poles disposed on the base and centered around the axial direction;

a circuit board controlling magnetism of the plurality of stator magnetic poles;

a first elastic element comprising a first head end, a first middle section and a first tail end, wherein the first head end is directly connected to the first middle section and the outer peripheral wall, the first tail end is directly connected to the first middle section and the outer peripheral wall, and the first head end, the first middle section and the first tail end are connected and extended sequentially in a direction around the axial direction; and a second elastic element comprising a second head end, a second middle section and a second tail end, wherein the second head end is directly connected to the second middle section and the outer peripheral wall, the second tail end is directly connected to the second middle section and the outer peripheral wall, and the second head end, the second middle section and the second tail end are connected and extended sequentially in a direction parallel to the axial direction.

2. The stator structure according to claim 1, wherein the first middle section comprises a first forward bend a first reverse bend and a second forward bend, and the first forward bend, the first reverse bend and the second forward bend are presented in sequence on the first middle section.

3. The stator structure according to claim 1, wherein the first middle section comprises a first forward bend, a second forward bend, a first reverse bend, a third forward bend and a fourth forward bend, and the first forward bend, the second forward bend, the first reverse bend, the third forward bend and the fourth forward bend are presented in sequence on the first middle section.

4. The stator structure according to claim 1, wherein the second middle section comprises a first reverse bend, a first forward bend, a second forward bend and a second reverse bend, and the first reverse bend, the first forward bend, the second forward bend and the second reverse bend are presented in sequence on the second middle section.

5. The stator structure according to claim 1, wherein the second middle section comprises a first reverse bend, a first forward bend, a second forward bend, a third forward bend, a fourth forward bend and a second reverse bend, and the first reverse bend, the first forward bend, the second forward bend, the third forward bend, the fourth forward bend and the second reverse bend are presented in sequence on the second middle section.

6. The stator structure according to claim 1, further comprising an external terminal, wherein the circuit board is electrically connected to the external terminal.

7. The stator structure according to claim 1, wherein the first middle section or the second middle section comprises a first positioning structure disposed on an outer surface thereof, and the first positioning structure is used to be assembled with a second positioning structure of a bottom seat.

8. The stator structure according to claim 1, wherein the base comprises a main body and a rear cover, which are assembled together along the axial direction to form the base, wherein the circuit board is disposed between the main body and the rear cover, and the through opening runs through the main body and the rear cover.

9. The stator structure according to claim 8, further comprising a plurality of conductive terminals, wherein the circuit board comprises a plurality of conductive contact points, the main body comprises a metal plate, and the plurality of conductive terminals passing through the metal plate are in corresponding contact with the conductive contact points, wherein the plurality conductive terminals are not electrically connected to the metal plate.

10. The stator structure according to claim 8, wherein the main body comprises a metal plate, the metal plate comprises a plurality of heat dissipation pillars, and the plurality of heat dissipation pillars face the front end.

11. A fan, comprising:

a stator structure, comprising:

a base comprising a front end, a rear end, an outer peripheral wall and a through opening, wherein the front end and the rear end are two opposite ends of the base in an axial direction, the through opening runs through a region surrounded by the front end and a region surrounded by the rear end along the axial direction, and the outer peripheral wall is an outer surface connected between the front end and the rear end;

a plurality of stator magnetic poles disposed on the base and centered around the axial direction;

a circuit board controlling magnetism of the plurality of stator magnetic poles;

a first elastic element comprising a first head end, a first middle section and a first tail end, wherein the first head end is directly connected to the first middle section and the outer peripheral wall, the first tail end is directly connected to the first middle section and the outer peripheral wall, and the first head end, the first middle section and the first tail end are connected and extended sequentially in a direction around the axial direction; and a second elastic element comprising a second head end, a second middle section and a second tail end, wherein the second head end is directly connected to the second middle section and the outer peripheral wall, the second tail end is directly connected to the second middle section and the outer peripheral wall, and the second head end, the second middle section and the second tail end are connected and extended sequentially in a direction parallel to the axial direction;

a rotating shaft pivotally connected to the stator structure through a bearing, wherein the rotating shaft is disposed along the axial direction, and aligned with the through opening;

a rotor structure connected to the rotating shaft and spatially corresponding to the stator structure, wherein the rotor structure is driven by the stator structure to rotate around the axial direction; and a blade set connected to the rotating shaft, wherein the blade set is driven by the rotor structure and the rotating shaft to rotate and generate an airflow.

12. The fan according to claim 11, wherein the first middle section comprises a first forward bend a first reverse bend and a second forward bend, and the first forward bend, the first reverse bend and the second forward bend are presented in sequence on the first middle section.

13. The fan according to claim 11, wherein the first middle section comprises a first forward bend, a second forward bend, a first reverse bend, a third forward bend and fourth forward bend, and the first forward bend, the second forward bend, the first reverse bend, the third forward bend and the fourth forward bend are presented in sequence on the first middle section.

14. The fan according to claim 11, wherein the second middle section comprises a first reverse bend, a first forward bend, a second forward bend and a second reverse bend, and the first reverse bend, the first forward bend, the second forward bend and the second reverse bend are presented in sequence on the second middle section.

15. The fan according to claim 11, wherein the second middle section comprises a first reverse bend, a first forward bend, a second forward bend, a third forward bend, a fourth forward bend and a second reverse bend, and the first reverse bend, the first forward bend, the second forward bend, the third forward bend, the fourth forward bend and the second reverse bend are presented in sequence on the second middle section.

16. The fan according to claim 11, wherein the stator structure further comprises an external terminal, and the circuit board is electrically connected to the external terminal.

17. The fan according to claim 11, further comprising a bottom seat and a housing cover, wherein the stator structure is fixed between the bottom seat and the housing cover, and the bottom seat and the housing cover are matched and assembled with each other to form an air inlet, an air outlet and an accommodation space, wherein the air inlet is arranged adjacent to the stator structure, the air inlet is in communication with the air outlet through the accommodation space along the axial direction, the blade set is accommodated in the accommodation space, and the rotating shaft runs through the air inlet and connected to the blade set.

18. The fan according to claim 17, wherein the air inlet comprises a front air inlet and a rear air inlet, the air outlet comprises a front air outlet and a rear air outlet, and the accommodation space comprises a front accommodation space and a rear accommodation space, wherein the front air inlet is disposed adjacent to the front end of the base, and the front air inlet is in communication with the front air outlet through the front accommodation space along the axial direction, wherein the rear air inlet is disposed adjacent to the rear end of the base, and the rear air inlet is in communication with the rear air outlet through the rear accommodation space along the axial direction, wherein the blade set comprises a front blade set and a rear blade set, the front blade set and the rear blade set are accommodated in the front accommodation space and the rear accommodation space, respectively, the rotating shaft runs through the stator structure through the through opening, the rotating shaft runs through the front air inlet and is connected to the front blade set, and the rotating shaft runs through the rear air inlet and is connected to the rear blade set.

19. The fan according to claim 17, wherein the first middle section or the second middle section comprises a first positioning structure disposed on an outer surface thereof, and the first positioning structure is used to be assembled with a second positioning structure of the bottom seat.

20. The fan according to claim 17, wherein the base further comprises a third positioning structure disposed on the outer peripheral wall, the third positioning structure is used to be assembled with a fourth positioning structure of the housing cover, and the bottom seat is assembled with the housing cover to cover the outside of the base.

* * * * *